(12) United States Patent  
Burgmeier et al.

(10) Patent No.: US 7,659,000 B2
(45) Date of Patent: Feb. 9, 2010

(54) ADHESION TECHNIQUE FOR INCOMPATIBLE POLYMERS USING MODIFIED POLYMER TIE LAYERS

(75) Inventors: Robert Burgmeier, Plymouth, MN (US); Richard L. Goodin, Blaine, MN (US); Joseph Delaney, Jr., Minneapolis, MN (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 556 days.

(21) Appl. No.: 10/822,581

(22) Filed: Apr. 12, 2004

(65) Prior Publication Data

US 2005/0227087 A1 Oct. 13, 2005

(51) Int. Cl.
 *B32B 27/38* (2006.01)
 *B32B 27/32* (2006.01)
 *B32B 27/34* (2006.01)
 *B32B 27/36* (2006.01)

(52) U.S. Cl. ............... 428/423.1; 428/423.7; 428/424.8
(58) Field of Classification Search ............. 428/411.1, 428/420, 474.4, 474.7, 476.1, 480, 423.1, 428/423.7, 424.8
See application file for complete search history.

(56) References Cited

U.S. PATENT DOCUMENTS

| | | | |
|---|---|---|---|
| 4,876,130 A | 10/1989 | Vonk et al. | |
| 5,082,742 A | 1/1992 | Padwa | |
| 5,195,969 A * | 3/1993 | Wang et al. | 604/96.01 |
| 5,270,086 A | 12/1993 | Hamlin | 428/35.2 |
| 5,290,306 A | 3/1994 | Trotta et al. | 606/194 |
| 5,441,488 A * | 8/1995 | Shimura et al. | 604/265 |
| 5,478,320 A | 12/1995 | Trotta | 604/103.06 |
| 5,620,649 A | 4/1997 | Trotta | 264/515 |
| 5,797,877 A | 8/1998 | Hamliton et al. | 604/96.01 |
| 5,871,468 A | 2/1999 | Kramer et al. | 604/96.01 |
| 5,879,369 A | 3/1999 | Ishida | 606/194 |
| 5,908,406 A | 6/1999 | Ostapchenke et al. | 604/96.01 |
| 6,086,556 A | 7/2000 | Hamliton et al. | 604/96.01 |
| 6,124,007 A | 9/2000 | Wang et al. | 428/35.2 |
| 6,238,408 B1 | 5/2001 | Kawabata et al. | 606/192 |
| 6,270,522 B1 | 8/2001 | Simhambhatla et al. | 623/1.11 |
| 6,319,228 B1 | 11/2001 | Kastenhofer | 604/96.01 |
| 6,328,925 B1 | 12/2001 | Wang et al. | 264/512 |
| 6,355,358 B1 * | 3/2002 | Boer et al. | 428/474.4 |

(Continued)

FOREIGN PATENT DOCUMENTS

EP 540 858 5/1993

(Continued)

OTHER PUBLICATIONS

Database WPI; Section Ch, Week 199114; Derwent Publications Ltd., London, GB; AN 1991-098626; XP002340067.

(Continued)

*Primary Examiner*—Thao T. Tran
(74) *Attorney, Agent, or Firm*—Vidas, Arrett & Steinkraus

(57) ABSTRACT

A coextrusion employing a tie layer between two layers of different polymer materials. The tie layer is formed in the extrusion melt of a composition comprising one of the two polymer materials and a coupling agent that includes functional groups that are reactive at least with functional groups on the second polymer. The coupling agent may be incorporated into the tie layer material in amounts above 5% by weight.

17 Claims, 2 Drawing Sheets

U.S. PATENT DOCUMENTS

| | | | |
|---|---|---|---|
| 6,386,240 B1 | 5/2002 | Roeber et al. | |
| 6,406,457 B1 | 6/2002 | Wang et al. | 604/96.01 |
| 6,464,683 B1 * | 10/2002 | Samuelson et al. | 604/524 |
| 6,471,673 B1 | 10/2002 | Kastenhofer | 604/103.06 |
| 6,488,655 B1 | 12/2002 | Wantink et al. | 604/103.09 |
| 6,659,977 B2 | 12/2003 | Kastenhofer | 604/96.01 |
| 2002/0081406 A1 | 6/2002 | Wang et al. | 428/35.2 |
| 2004/0034166 A1 | 2/2004 | Botros | 525/192 |

FOREIGN PATENT DOCUMENTS

| | | |
|---|---|---|
| EP | 0 870 604 | 10/1998 |
| EP | 0 873 759 | 10/1998 |
| JP | 3 043 246 | 2/1991 |
| WO | WO 02/090403 | 11/2002 |

OTHER PUBLICATIONS

Shell Oil Company; M Prado et al; "Grafting high levels of maleic anhydride onto hydrogenated block copolymers (Shell Oil Company, M Prado, R S Reichenbach, R Gelles)" Research Disclosure, Kenneth Mason Publications, Westbourne, GB, vol. 353, No. 27, Sep. 1993, XP007119306 ISSN: 0374-4353.

Recent web-site showing the book "Reactive Extrusion Systems" of Janssen and Janssen with publication date and a small description of its content.

EP Opposition document for EP1740378 dated Feb. 18, 2009.

\* cited by examiner

ADHESION TECHNIQUE FOR INCOMPATIBLE POLYMERS USING MODIFIED POLYMER TIE LAYERS

BACKGROUND OF THE INVENTION

Laminate tubing prepared by coextrusion of polymer materials is known and used as catheter shafts or shaft segments and as parisons for preparation of catheter balloons.

In the manufacture of articles having multiple layers of polymers, it is known to include a tie layer between layers of immiscible polymers to improve adhesion. For instance in the manufacture of catheters and catheter balloons, a multilayer tube may be obtained by extrusion of different polymers. A first layer of high strength polymer such as polyester or polyamide, may be coextruded with a second layer, for instance of a polyolefin, fluorinated polymer, or ethylene acrylic acid copolymer, with an intermediate tie layer resin therebetween. Tie layers are sometimes formed of materials having some functional groups or chain fragments which have compatibility with the first layer material and other groups or chain fragments which have compatibility with the second layer material.

Patents which describe coextruded catheter tubing or balloon parison tubing, with or without tie layers, include U.S. Pat. No. 5,270,086 (Hamlin); U.S. Pat. No. 5,195,969 (Wang et al), U.S. Pat. No. 5,797,877 (Hamilton et al); U.S. Pat. No. 5,290,306 (Trotta); U.S. Pat. No. 5,478,320 (Trotta); U.S. Pat. No. 5,879,369 (Ishida); U.S. Pat. No. 6,319,228 (Kastenhofer); U.S. Pat. No. 6,464,683 (Samuelson et al). Materials which have been employed for tie layers include functionally modified polyolefins (for example, Plexar, available from Equistar Chemicals) or an adhesive resin such as Bynel from DuPont or Nucral (an ethylene methacrylic acid copolymer) available from DuPont.

Often tie layers formed of commercial thermoplastic materials are not entirely satisfactory. Sometimes the tie layer has insufficient similarity to one or the other of the layer materials. Commercial materials used for this purpose have not been tailored to the specific polymers employed in these applications and synthesis of a custom tie layer polymer, optimized to a specific combination of covering and underlying polymers, if possible, would require a skill level beyond that available to even very sophisticated device fabricators. It is therefore desirable to find improved tie layer materials and methods for preparation thereof which allow a fabricator to modify tie layer properties without engaging in substantial polymer synthesis activities.

SUMMARY OF THE INVENTION

The present invention proposes that for a given pair of polymer layer materials from which a laminate article is to be formed, a custom tie layer can be prepared by melt modification of one of the layer materials in a manner which can be tailored to improve bonding performance for the specific layer material pair. The resulting articles provide one aspect of the invention.

Another aspect of the invention is a method for preparing a laminate which comprises melt extruding two layers of different polymers, with a tie layer in between the two layers, wherein the tie layer is a melt modified product of one of the two different polymers and a coupling agent that is reactive with the other of the two different polymers. In some embodiments the tie layer is modified to provide the tie layer polymer material with a coupling agent content 5% or more by weight.

The tie layer may be provided with a catalyst which promotes reaction between the coupling agent functional groups and functional groups on the other polymer. A catalyst may also be used to promote reaction with the first polymer material.

In some embodiments the tie layer polymer is irradiatively crosslinked after extrusion. In more particular embodiments the irradiation is applied selectively to a specific area so that crosslinking only occurs at such selectively crosslinked areas.

DETAILED DESCRIPTION OF THE INVENTION

Figure 1:
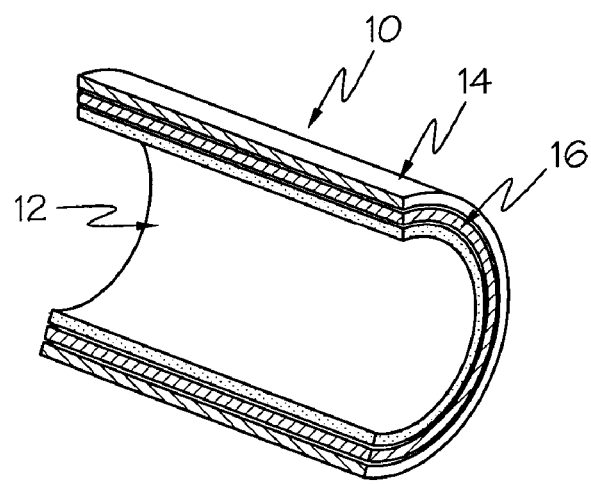
FIG. 1 is a sectional perspective view of a tube parison in accordance with the invention.

All published documents, including all US patent documents, mentioned anywhere in this application are hereby expressly incorporated herein by reference in their entirety. Any copending patent applications, mentioned anywhere in this application are also hereby expressly incorporated herein by reference in their entirety.

Articles prepared in accordance with the invention may be for instance tubing, especially medical device tubing for catheters and the like, and devices prepared from laminate tubing such as balloons, polymer stents, sheaths, and the like.

Preferred embodiments of the invention are specifically directed to coextruded tubes used for catheter shafts or as parisons for medical catheter balloons. Laminates which produce particular problems include polyester/polyamide, (e.g. PET and nylon 12); polyester/polyolefin (e.g. PET and polyethylene); and polyamide/polyolefin (e.g. nylon 12 and polyethylene).

In accordance with an embodiment of the invention a tie layer material for such polymer pairs is prepared, preferably in the extruder, by melt reaction of one of the two polymers, a coupling agent reactive with both polymers and optionally a catalyst. The coupling agent is suitably employed, in an amount of at least 5% by weight, suitably 7% to 35%, and preferably 10-20% by weight of the total tie layer material. In some embodiments the coupling agent may be employed in lesser amounts, for instance from about 0.5% or more.

Although polymer degradation reactions may occur under the conditions utilized to form the tie layer, they are confined to the tie layer itself and at the immediate interfaces with the first and second layers. This keeps the properties of the underlying and overlaying layers substantially intact, while allowing the tie layer to be tailored to maximize adhesive strength with little regard for polymer integrity.

One example of a suitable coupling agent is maleic anhydride. Maleic anhydride copolymers with olefins have been used as tie layers in the past, but the amount of maleic anhydride employed has been less than 5% of the copolymer. In accordance with the invention, however, maleic anhydride may be used as a polymer modifying agent for the tie layer only.

In one example a tube having a first layer of polyamide, (nylon 12), and a second layer of polyester (PET), are joined using a modified polyamide tie layer. The tie layer material is produced in the extruder melt zone by reacting nylon 12, maleic anhydride and triphenyl phosphite, or other suitable catalyst, and extruding the melt mixture as a relatively thin layer onto the polyamide layer, followed by extrusion of the PET layer thereover. In the melt, terminal amine groups of the polyamide may react with the with the anhydride groups of the maleic anhydride coupling agent. The maleic anhydride double bonds can also add to each other by radical addition. Amide interchange reactions will also occur. The polyamide structure will be retained sufficiently that the interface between the first layer and the tie layer will be obscured to some extent by like-polymer diffusion, which is enhanced if the extrusion is subsequently thermally processed such as by balloon formation. At the PET layer interface, the triphenyl phosphite will catalyze ester interchange reactions between acid and anhydride groups in the tie layer and the PET polymer, esterification reactions with hydroxyl groups at chain ends and/or amidization reactions between amine groups of the tie layer polymer and anhydride groups.

In an alternative to the previous example the materials of the first and second layers may be switched, i.e. the underlying layer may be PET and the overlying layer may be nylon 12.

In another example using the same first and second layer materials, the tie layer is formed of a melt blend of PET, maleic anhydride and triphenyl phosphite or other suitable catalyst.

In a further embodiment of the invention the two structural layers may be polyester and polyolefin, again in either order. For purposes of this invention the term "polyolefin" includes, in addition to homopolymers of olefin monomers, and copolymers thereof, but also copolymers comprising a major amount of olefin monomer residue and a minor amount of other carbon-carbon double bonded monomer residue, for instance vinyl acetate and/or vinyl alcohol residue, (meth) acrylate ester, acid and salt residues, and the like.

For example a PET first layer, a tie layer of polyethylene, maleic anhydride and triphenyl phosphite catalyst, and a polyethylene second layer are coextruded. At melt temperatures the maleic anhydride double bonds can add to each other and to residual double bonds in the polyolefin, while at the same time polyolefin degradation reactions are occurring so that the average molecular weight may be substantially lower than the starting material. At the polyethylene interface, like polymer diffusion and some of the same covalent reactions can occur. At the PET interface, esterification and transesterification reactions will occur to provide covalent ester linkages between the tie layer and the PET layer. Once again, by confining the reactive components to the tie layer, sacrifice of molecular weight for improved adhesion provides a beneficial structure which could not be obtained if the same reactants were simply added to the polyolefin structural layer.

Examples of coupling agents which can be employed to modify the tie layer material are:

anhydrides of polycarboxylic acids (i.e. anhydrides of compounds having two or more carboxylic acid groups), with or without ethylenic unsaturation, for instance 1,2-phthalic anhydride, trimellitic acid anhydride; nadic anhydride, maleic anhydride, glutaric anhydride, succinic anhydride, adipic anhydride, azelaic anhydride, sebacic anhydride, and decanedicarboxylic anhydride;

polyepoxide compounds, (i.e. compounds having two or more epoxy groups thereon), for instance the diglycidyl ethers of bisphenol compounds such as bisphenol A, B, F, G, and H, diglycidyl ethers of alkoxylated bisphenol compounds, epoxy novolac resins, epoxidized polybutadiene resins, and epoxidized drying oils;

polyoxazalines, for instance 1,2-Bis(2-oxazolinyl-2)-benzene; 1,3-Bis(2-oxazolinyl-2)-benzene; 1,4-Bis(2-oxazolinyl-2)-benzene; 1,2-Bis(2-4-methyl-oxazolinyl-2)-benzene; 1,3-Bis(2-4-methyl-oxazolinyl-2)-benzene; 1,4-Bis(2-4-methyl-oxazolinyl-2)-benzene; 1,2-Bis(2-5-ethyl-oxazolinyl-2)-benzene; 1,3-Bis(2-5-ethyl-oxazolinyl-2)-benzene; 1,4-Bis(2-5-ethyl-oxazolinyl-2)-benzene; 1,2,4-Tris-(2-oxazolinyl-2)-benzene; 1,3,5-Tris-(2-oxazolinyl-2)-benzene; 1,2,4,5-Tetrakis-(2-oxazolinyl-2)-benzene; 1,2-Bis (2-oxazolinyl-2)-ethane; 1,4-Bis(2-oxazolinyl-2)-butane; and 1,4-Bis(2-5-methyl-oxazolinyl-2)-butane;

carbodiimides such as N,N'-di (2,6-diisopropylphenyl)-carbodiimide (trade name: Staboxol 1 from Rhein Chemie) and N,N'-di cyclohexylcarbodiimide; and polyisocyanates, such as 2,4'-methylene bis(phenylisocyanate), 4,4'-methylene bis(phenylisocyanate) and mixtures thereof, toluene diisocyanate, m-xylylene diisocyanate, 1,5-naphthalene diisocyanate, 1,4-diisocyanatobenzene, hexamethylene diisocyanate, isophorone diisocyanate, trimethylhexamethylene diisocyanate; 2,2,4- and/or 2,4,4-trimethylhexamethylene diisocyanate, di(isocyanatocyclohexyl)methane, and isocyanatomethyl-1,8-octane diisocyanate, as well as oligomers oligomers and prepolymers of these compounds, for instance polymeric MDI, carbodiimide, isocyanurate or uretonimine modified polyisocyanates, and isocyanate-terminated prepolymers prepared by reacting excess organic polyisocyanate with a minor amount of a compound having at least two active hydrogen-containing groups thereon.

Preferably such compounds have very little or no reactivity at ambient temperature and have a high reactivity at melt temperature so that the reactions of concern only occur in the melt, but in the melt occur at a rate which allows substantial completion so that a consistent tie layer product is obtained from batch to batch. At least for this reason cyclic anhydrides may be preferred coupling agents, especially those also having ethylenic unsaturation. In some cases at least, relative reactivity at ambient and melt can be ascertained by DSC or by monitoring reaction kinetics using spectrographic means such as FTIR.

The melt composition used to form the tie layer may also include a catalyst to facilitate interfacial reaction of the tie layer coupling agent with the first and/or second layer materials as they are coextruded. The term "catalyst" in this application includes compounds that initiate or accelerate one or more of such coupling agent reactions, regardless of whether or not the catalyst compound is consumed in the course of those reactions. Preferably the catalyst will at least promote formation of covalent bonds between the coupling agent and the first or second layer polymer material which is different from the polymer which is not incorporated into the tie layer composition. Catalysts which may be employed include:

tri-valent phosphorous compounds such as diethyl phosphite, triphenyl phosphite, trisdodecyl phosphite and trisnonyldecyl phosphite, metal salts of phosphorous acid or hypophosphorous acid;

pentavalent phosphoric compounds such as orthophosphoric acid, polyphosphoric acid, their esters (such as trimethyl phosphate, triethyl phosphate, tri-n-butyl phosphate, trioctyl phosphate, triphenyl phosphate, tricresyl phosphate, tris(triethylene glycol) phosphate and ethyldiethyl phosphonoacetate, and acid phosphoric compounds such as methyl acid phosphate, ethyl acid phosphate, isopropyl acid phosphate, butyl acid phosphate, dibutyl phosphate, monobutyl phosphate, dioctyl phosphate and triethylene glycol acid phosphate;

tin compounds such as dibutyltin dilaurate, dibutyltin diacetate, tin (II) acetate, tin (II) octanoate, tin (II) ethylhexanoate, tin (II) laurate, diethyltin diacetate, dibutyltin diacetate, dibutyltin dilaurate, dibutyltin maleate, dihexyltin diacetate, dioctyltin diacetate, dibutyltin diisooctyl maleate, dimethyltin dimercaptide, dibutyltin dimercaptide, dioctyltin dimercaptide, dibutyltin diisooctyl mercapto acetate, titanate compounds such as tetra-n-propyl titanate, tetraisopropyl titanate, tetra-n-butyl titanate, titanic acid oxalate, and potassium titanate oxalate;

tertiary amines such as N,N',N''-dimethylaminopropylhexahydrotriazine, and 1,4-diazabicyclooctane and N,N,N',N'-tetramethyl hexamethylene diamine; and blocked tertiary amines, for instance organic acid blocked dimethyl cyclohexylamine, organic acid blocked triethylene diamine, organic acid blocked N-methyl morpholine, organic acid blocked N-ethyl morpholine, organic acid blocked dimethylbenzylamine, and organic acid blocked tetramethylethylenediamine, wherein the organic acid blocking agent may be a mono- or dicarboxylic acid having 1-20 carbon atoms, such as formic, acetic, propionic, butyric, caproic, 2-ethyl-hexanoic, caprylic, cyanoacetic, pyruvic, benzoic, oxalic, malonic, succinic, and maleic acids.

Mixtures of the above catalysts may also be employed. The amount of catalyst employed in the tie layer composition may range from 0.01% to 10%, typically from 0.5%, to 3%, for instance 1% to 2%, based on total composition.

In keeping with the definition of "catalyst" given above, in some cases a radical initiator may be employed as the catalyst or a component of the catalyst.

In a further aspect of the invention, an outer layer of polyolefin resin is employed and the tie layer is formed from the polyolefin polymer. After formation of the laminate, a portion of the polyolefin is crosslinked by ionizing radiation, for instance as described in EP 540858. The crosslinking will build a secondary network which further integrates the tie layer with the outer polyolefin polymer layer, further increases adhesive strength and reduces or eliminates the meltability of the polyolefin and tie-layers.

Figure 4:
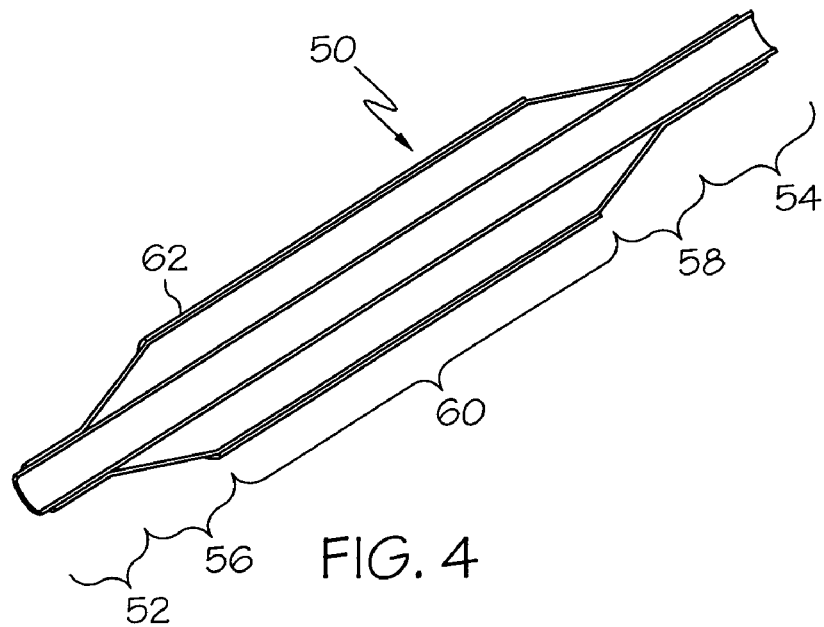
FIG. 4 is a view as in FIG. 2 of a balloon prepared from a parison prepared as in FIG. 3.

Optionally a mask is used during irradiation to define areas which are unexposed to the ionizing radiation. At this point there will be a substantial difference in adhesive peel strength between uncrosslinked and crosslinked tie layer regions, so that in the masked areas the outer layer can be removed by peeling, but will remain firmly attached to the inner in the crosslinked area. This allows construction of a balloon as shown in FIG. 4.

Referring to FIG. 1 there is shown a sectional perspective view of a tube parison 10 in accordance with the invention. Tube has a coextruded three layer construction comprising an inner layer 12, formed e.g. of PET, an outer layer 14, formed e.g. of polyethylene, and a tie layer 16, formed e.g. of melt modified polyethylene. The melt modified polyethylene may be functionalized by inclusion in the melt of 10-20%, total weight basis, of maleic anhydride and 0.1-1% triphenyl phosphite or other suitable catalyst.

Figure 2:
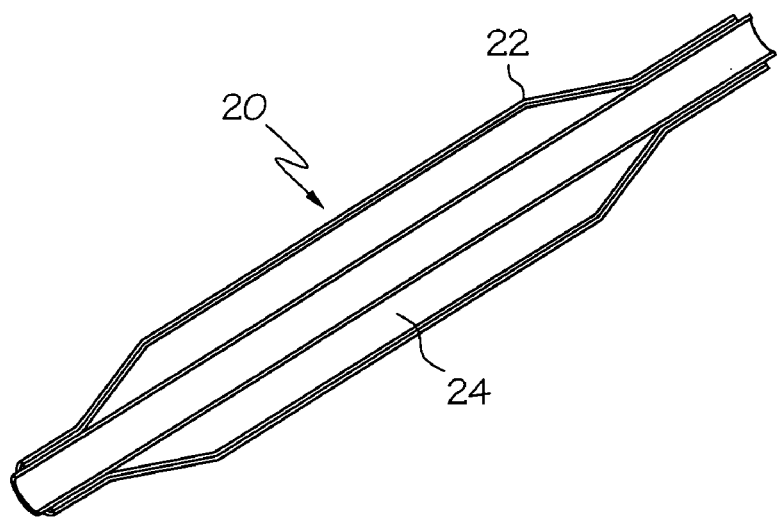
FIG. 2 is a sectional perspective view of a balloon, prepared from a parison as in FIG. 1, mounted on a catheter shaft.

FIG. 2 shows a fragmentary sectional view of a balloon 20 mounted on a catheter shaft segment. The balloon 20 is made from a tube parison as in FIG. 1, which was crosslinked by irradiation over its entire length. The balloon has an inner layer 24, an outer layer 26. In this balloon the tie layer has partially diffused into layer 22 and has also been crosslinked by the irradiation so that the transition between layer 22 and the tie layer is indistinct. Following balloon formation the crosslinked polyethylene layer 22 may be heat set in a folded configuration, e.g. a trifold, at a relatively low temperature which will not substantially affect the strength and distension properties of the balloon. This balloon 20 has substantially improved rewrap characteristics over a single layer PET balloon and provides improved pinhole resistance. The bonding integrity of the laminate of polyethylene and PET layers is substantially improved relative to laminates prepared without tie layers or tie layers formed of commercial ionomer resins (typically acrylate modified polyethylene).

Crosslinking of a polyolefin outer layer is an optional process. When polyethylene or other polyolefins are used as an outer layer material crosslinking is recommended to improve the physical properties of the outer layer and form covalent linkages between the outer and tie layer materials. An energy intensity, duration and wavelength which will penetrate to the tie layer can also promote covalent linkages within the tie layer to thereby improve the cohesive strength of the tie layer.

Figure 3:
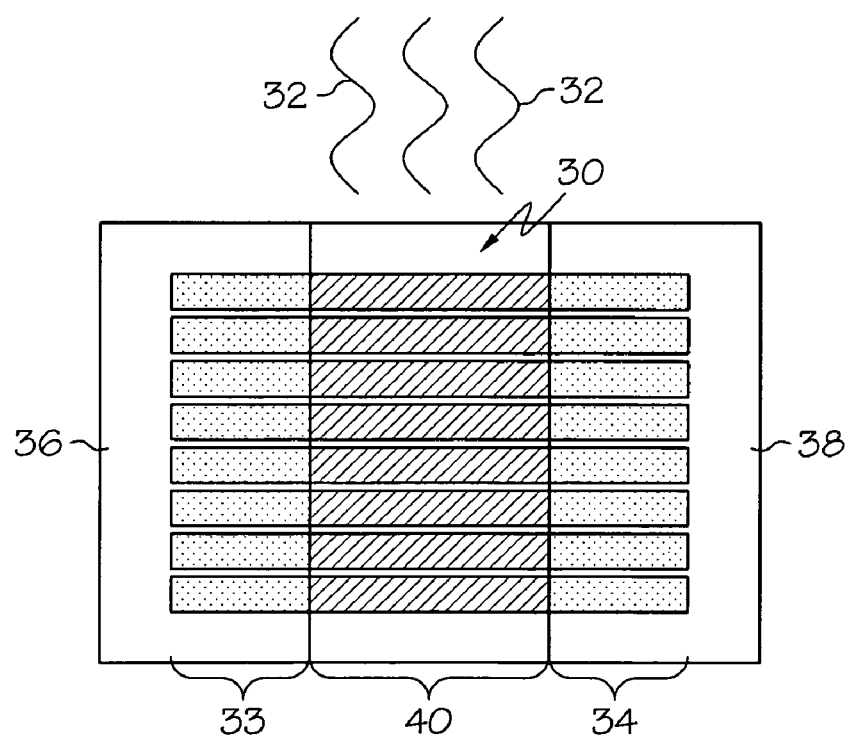
FIG. 3 shows schematically a set of eight balloon parison tubes as in FIG. 1, being selectively irradiated with ionizing radiation.

FIG. 3 shows a set of eight balloon parison tubes 30, prepared as in FIG. 1, being irradiated with ionizing radiation indicated by the lines 32. Each of the tubes 30 have two end regions 33, 34, protected by masks 36, 38. In the central unmasked region 40 of the tubes 30, both the outer polyethylene layer and the modified polyethylene tie layer are crosslinked by the radiation and form a joined network, but regions 33, 34 remain uncrosslinked. After irradiation, the outer layer of the protected end regions 33, 34 are removed by peeling. The outer layer remains in place over the central unmasked region 40 of the tubes 30.

Tubes 30 may then be placed in a mold and blow formed into a balloon 50 as shown in FIG. 4, also shown mounted on a catheter shaft segment. The balloon has proximal and distal waist portions 52, 54, proximal and distal cone portions 56, 58 and a central body portion 60. The central body portion 60 is formed from the crosslinked unmasked region 40 of a tube 30 and therefore has a laminate structure in which the outer layer 62 is crosslinked polyethylene which, on its inner side, transitions indistinctly to the tie layer. The waist and cone portions 52, 54, 56 and 58, have been formed from the parison tube end portions after peeling the uncrosslinked polyethylene layer. Therefore they have a lower profile than would have been produced if the outer layer had not been removed. As with the balloon of FIG. 3, the crosslinked polyethylene outer layer 62 of balloon 50 will readily take a heat set crease to improve rewrap and will provide improved pin-hole resistance. Layer 62 also provides protection for the inner PET layer if, when mounted on and folded against a catheter, a stent is crimped over the balloon 50.

In still other embodiments, a coextruded tube is formed in the manner described for FIG. 1, but using alternate inner and/or outer layer materials as already described. Such tubing may be sized and configured for use as catheters or balloon parisons, or other devices using a laminate polymer construction, for instance stents, sensors, incontinence devices (e.g. bladder slings), drug delivery devices and the like.

The above examples and disclosure are intended to be illustrative and not exhaustive. These examples and description will suggest many variations and alternatives to one of ordinary skill in this art. All these alternatives and variations are intended to be included within the scope of the claims, where the term "comprising" means "including, but not limited to". Those familiar with the art may recognize other equivalents to the specific embodiments described herein which equivalents are also intended to be encompassed by the claims. Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

The invention claimed is:

1. An article comprising a laminate having first and second layers and a tie-layer therebetween bonding the first and second layers, the first and second layers formed, respectively, of first and second polymer materials, the first and second polymer materials being different, wherein
the first and second polymer materials, respectively, have first and second functional groups thereon, and
the tie layer is formed of a tie-layer polymer material obtained by melt modification of one of the first or the second polymer materials, said melt modification comprising incorporation therein of at least 5% by weight of a coupling agent, the coupling agent having functional groups thereon, at least some of which are reactive in the melt with at least the functional groups on the other of said first and second polymer materials, said coupling agent being selected from the group consisting of compounds having plural epoxy groups thereon, compounds having plural oxazaline groups thereon, compounds having plural carbodiimide groups thereon and compounds having plural isocyanate groups thereon.

2. An article as in claim 1 wherein the coupling agent functional groups further comprise functional groups which are reactive in the melt with the functional groups of said one of the first and second polymer materials.

3. An article as in claim 1 wherein the tie layer polymer has been crosslinked after formation of the laminate.

4. An article as in claim 1 wherein the first polymer material is a polyester or a polyamide, the second polymer material is a polyolefin and the tie layer material is obtained by modifying the second polymer material.

5. An article as in claim 1 wherein the coupling agent is incorporated into the tie layer material in an amount of from about 7% to about 35% by weight.

6. An article as in claim 1 wherein the coupling agent is incorporated into the tie layer material in an amount of 10-20% by weight.

7. Coextruded medical device tubing comprising a laminate having first and second layers and a tie-layer therebetween bonding the first and second layers, the first and second layers formed, respectively, of first and second polymer materials, the first and second polymer materials being different, wherein the first and second polymer materials, respectively, have first and second functional groups thereon, the tie layer is formed of a tie-layer polymer material obtained by melt modification of one the first or the second polymer materials, said melt modification comprising incorporation therein of at least 5% by weight of a coupling agent, the coupling agent having functional groups thereon, at least some of which are reactive in the melt with at least the functional groups on the other of said first and second polymer materials, and wherein
a) the coupling agent is a member of the group consisting of compounds having plural epoxy groups thereon, compounds having plural oxazaline groups thereon, compounds having plural carbodiimide groups thereon and compounds having plural isocyanate groups thereon, and/or
b) the tie layer material further comprises a catalyst for reaction of the coupling agent with functional groups on said other of said first and second polymer materials.

8. Coextruded medical device tubing as in claim 7 wherein the coupling agent functional groups further comprise functional groups which are reactive in the melt with the functional groups of said one of the first and second polymer materials.

9. Coextruded medical device tubing as in claim 7 wherein the tie layer polymer has been irradiatively crosslinked.

10. Coextruded medical device tubing as in claim 7 wherein the first polymer material is a polyester.

11. Coextruded medical device tubing as in claim 7 where the second polymer material is a polyolefin or a polyamide.

12. Coextruded medical device tubing as in claim 11 wherein the tie layer polymer material is a modified polyolefin or polyamide.

13. Coextruded medical device tubing as in claim 11 wherein the first polymer material is a polyester or a polyamide, the second polymer material is a polyolefin and the tie layer material is obtained by modifying the second polymer material.

14. Coextruded medical device tubing as in claim 13 wherein at least a portion of the second polymer material and the tie-layer polymer material have been crosslinked after formation of the laminate.

15. Coextruded medical device tubing as in claim 7 wherein the coupling agent is incorporated into the tie layer material in an amount of from 7% to about 35% by weight.

16. Coextruded medical device tubing as in claim 15 wherein the coupling agent is incorporated into the tie layer material in an amount of 10-20% by weight.

17. Coextruded medical device tubing as claim 7 wherein the tie layer includes said catalyst and the catalyst is selected from the group consisting of tri-valent phosphorous compounds, pentavalent phosphoric compounds, tin compounds, titanate compounds, tertiary amines, blocked amines, and mixtures thereof.

* * * * *

UNITED STATES PATENT AND TRADEMARK OFFICE
CERTIFICATE OF CORRECTION

PATENT NO. : 7,659,000 B2  Page 1 of 1
APPLICATION NO. : 10/822581
DATED : February 9, 2010
INVENTOR(S) : Burgmeier et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 229 days.

Signed and Sealed this

Thirtieth Day of November, 2010

David J. Kappos
*Director of the United States Patent and Trademark Office*